United States Patent
Masuyama (10) Patent No.: US 8,861,950 B2
(45) Date of Patent: Oct. 14, 2014

(54) IMAGING APPARATUS AND CONTROL METHOD THEREOF

(75) Inventor: Kimihiro Masuyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 13/417,007

(22) Filed: Mar. 9, 2012

(65) Prior Publication Data
US 2012/0237195 A1    Sep. 20, 2012

(30) Foreign Application Priority Data

Mar. 15, 2011    (JP) ................................. 2011-056809

(51) Int. Cl.
| | |
|---|---|
| G03B 7/091 | (2006.01) |
| G03B 7/099 | (2014.01) |
| G03B 13/36 | (2006.01) |
| G03B 7/08 | (2014.01) |

(52) U.S. Cl.
CPC .............. *G03B 7/08* (2013.01); *G03B 7/09916* (2013.01); *G03B 13/36* (2013.01)
USPC ............ 396/234; 396/121; 348/362; 348/645

(58) Field of Classification Search
USPC ......................................... 396/121–123, 234
See application file for complete search history.

(56) References Cited

U.S. PATENT DOCUMENTS

| | | | | |
|---|---|---|---|---|
| 5,255,044 A | * | 10/1993 | Ishiguro ............................ | 396/95 |
| 5,313,246 A | * | 5/1994 | Takagi et al. .................. | 396/122 |
| 8,103,158 B2 | * | 1/2012 | Yoshida ........................ | 396/121 |
| 8,200,080 B2 | * | 6/2012 | Kojima ......................... | 396/121 |

FOREIGN PATENT DOCUMENTS

JP    2001-356384 A    12/2001

* cited by examiner

*Primary Examiner* — Clayton E Laballe
*Assistant Examiner* — Leon W Rhodes, Jr.
(74) *Attorney, Agent, or Firm* — Canon U.S.A., Inc. IP Division (57) ABSTRACT

A determination unit determines a weighting coefficient for a second light metering area corresponding to a focus detection area at which a second defocus amount having an absolute value larger than an absolute value of a first defocus amount is acquired relatively smaller than a weighting coefficient for a first light metering area corresponding to a focus detection area at which a first defocus amount is acquired, and changes a difference between the weighting coefficient for the first light metering area and the weighting coefficient for the second light metering area based on a plurality of defocus amounts including the defocus amount of the focus detection area not corresponding to the first light metering area and the second light metering area.

24 Claims, 7 Drawing Sheets

| | | ? | | | |
|---|---|---|---|---|---|
| -3 | -18 | -20 | -3 | -10 | |
| 0 | 2 | -15 | -18 | 1 | -2 | 4 |
| -1 | -16 | -3 | 0 | -3 | |
| | | -4 | | | |

| | | ? | | | |
|---|---|---|---|---|---|
| -60 | -90 | ? | ? | -127 | |
| 0 | 2 | -87 | -110 | -116 | -127 | -120 |
| -1 | -80 | -100 | -120 | -110 | |
| | | -108 | | | |

FIG. 6

IMAGING APPARATUS AND CONTROL METHOD THEREOF

BACKGROUND OF THE INVENTION

1. Field of the Invention

The present invention relates to an imaging apparatus that includes a plurality of focus detection areas and performs exposure control by using a defocus amount of each focus detection area.

2. Description of the Related Art

Conventionally, in a light metering unit used in a camera or the like, a weighted value has been assigned, based on the defocus amount of each of the plurality of focus detection areas, with respect to a light metering value obtained from each of a plurality of light metering sensors positioned corresponding to the plurality of focus detection areas.

In a method, for example, discussed in Japanese Patent Laid-open No. 2001-356384, a larger weighted value is assigned, based on a defocus amount of each of a plurality of focus detection areas, with respect to the corresponding light metering area as an absolute value of a defocus amount thereof is smaller (i.e., in focus). In this case, the following problem arises.

For example, in a case where a depth of field becomes deeper by reducing an aperture size and thus many background areas are in focus in a state where a camera focuses on a main object, not only areas including the main object but also the background areas in focus are largely weighted. Therefore, brightness of the background exerts more influence to disturb an appropriate exposure to be applied to the main object.

SUMMARY OF THE INVENTION

According to an aspect of the present invention, an imaging apparatus including a plurality of focus detection areas and a plurality of light metering areas includes a defocus amount acquisition unit configured to acquire a defocus amount of each focus detection area, a light metering unit configured to acquire a light metering value of each light metering area, and a determination unit configured to determine a weighting coefficient for each light metering area, wherein the determination unit determines the weighting coefficient for a second light metering area corresponding to a focus detection area at which a second defocus amount having an absolute value larger than an absolute value of a first defocus amount is acquired relatively smaller than the weighting coefficient for a first light metering area corresponding to a focus detection area at which a first defocus amount is acquired, and changes a difference between the weighting coefficient for the first light metering area and the weighting coefficient for the second light metering area based on a plurality of defocus amounts including the defocus amount of the focus detection area not corresponding to the first light metering area and the second light metering area, the plurality of defocus amounts being acquired by the defocus amount acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE PREFERRED EMBODIMENTS

Various exemplary embodiments, features, and aspects of the invention will be described in detail below with reference to the drawings.

Figure 1:
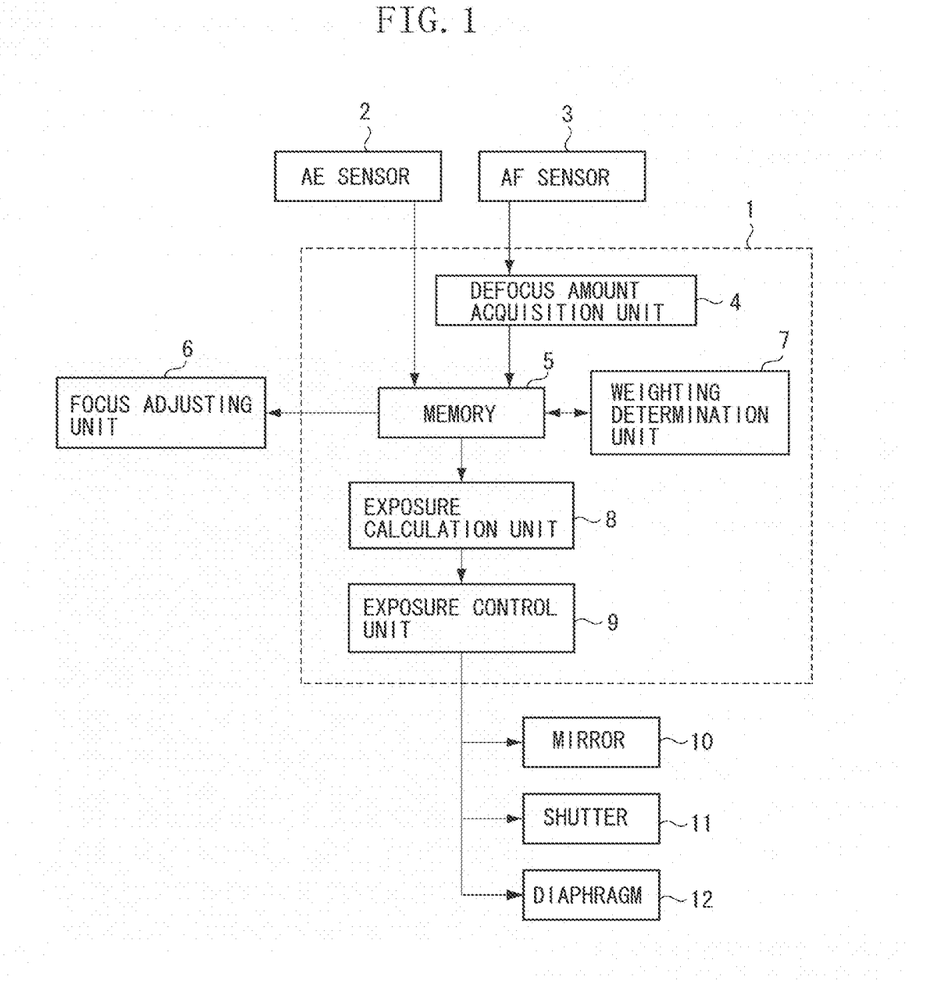
FIG. 1 is a block diagram illustrating an entire configuration of an imaging apparatus according to a first exemplary embodiment of the present invention.

FIG. 1 is a block diagram illustrating an entire configuration of a camera as an imaging apparatus according to a first exemplary embodiment according to the present invention.

A central processing unit (CPU) 1 controls various operations of the camera. An automatic exposure sensor (AE sensor) 2 includes a plurality of light metering areas and outputs a light metering value per each light metering area. The light metering values output from the AE sensor 2 are stored in a memory 5.

An autofocus sensor (AF sensor) 3 includes a plurality of focus detection areas and assigns a pair of line sensors to each focus detection area to capture an image necessary for a focus detection. A defocus amount acquisition unit 4 acquires a defocus amount in each focus detection area based on the output from the AF sensor 3. A focus adjusting unit 6 refers to the defocus amount of each focus detection area acquired by the defocus amount acquisition unit 4 to cause a photographing lens (not illustrated) to drive thereof for the focus detection area selected according to a predetermined algorism, thereby completing the focus adjustment. After completing the focus adjustment operation, the defocus amount of each focus detection area after completing the focus adjustment is stored in the memory 5.

An exposure calculation unit 8 calculates an averaged light metering value Ea of all the plurality of light metering areas and an averaged light metering value Ef of the light metering areas corresponding to the focus detection areas with respect to the light metering values obtained by the AE sensor 2. The exposure calculation unit 8 performs a weighting calculation to obtain a final light metering value E to be used in an exposure control by using the following equation (1).

$$E = (1-k) \times Ea + k \times Ef \qquad (1)$$

The averaged light metering value Ef is obtained in such a manner that the light metering value of each light metering area is weighted and averaged by increasing the weighting with respect to each of the light metering areas corresponding to the focus detection areas as an absolute value of the defocus amount of the corresponding focus detection area is smaller. "k" in equation (1) represents a weighting coefficient determined by a weighting determination unit 7 based on the defocus amount of each focus detection area acquired by the defocus amount acquisition unit 4. A method for determining the weighting coefficient k performed by the weighting determining unit 7 is described below in detail with reference to FIG. 5.

The exposure calculation unit 8 calculates an exposure value based on a final light metering value E and a focal length information, an open aperture value, an exit pupil position, vignetting, and the like of a photographing lens stored in the memory 5. In the present exemplary embodiment, the photographing lens is detachable from a main body of the camera. Thus, the information of the focal length, the open aperture value, the exit pupil position, the vignetting, and the like of the photographing lens are stored in the memory 5 through a communication between the CPU 1 and a CPU built-in the photographing lens.

An exposure control unit 9 controls a mirror 10, a shutter 11, and a diaphragm 12 based on the exposure value obtained by the exposure calculation unit 8 when a release button (not illustrated) of the camera is pressed. In the present exemplary embodiment, all the functions of the defocus amount acquisition unit 4, the memory 5, the weighting determination unit 7, the exposure calculation unit 8, and the exposure control unit 9 are realized by the CPU 1. However, at least a portion of the above described functions may be realized by a control unit other than the CPU 1.

Figure 2:
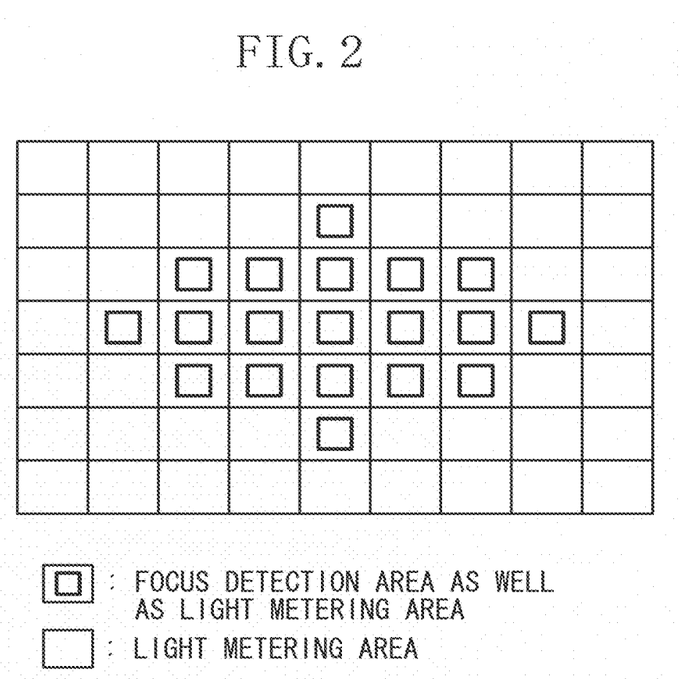
FIG. 2 illustrates light metering areas and focus detection areas of the imaging apparatus according to the first exemplary embodiment of the present invention.

FIG. 2 illustrates a relationship between the light metering areas of the AE sensor 2 and the focus detection areas of the AF sensor 3. The AE sensor 2 is divided into 7 parts in a vertical direction and into 9 parts in a horizontal direction, i.e., includes a total 63 light metering areas. 19 light metering areas lactated near the center of thereof are light metering areas corresponding to the focus detection areas. In other words, the 19 light metering areas among the 63 light metering areas are arranged at positions corresponding to the focus detection areas and the remaining light metering areas are arranged at positions not corresponding to the focus detection areas.

The above-described averaged light metering value Ea of all the plurality of light metering areas becomes an averaged value obtained by averaging the light metering values of the 63 light metering areas. An averaged light metering value Ef of the light metering areas corresponding to the focus detection areas becomes a value obtained by weighting and averaging the light metering values of the 19 light metering areas positioned near the center thereof.

Figure 3:
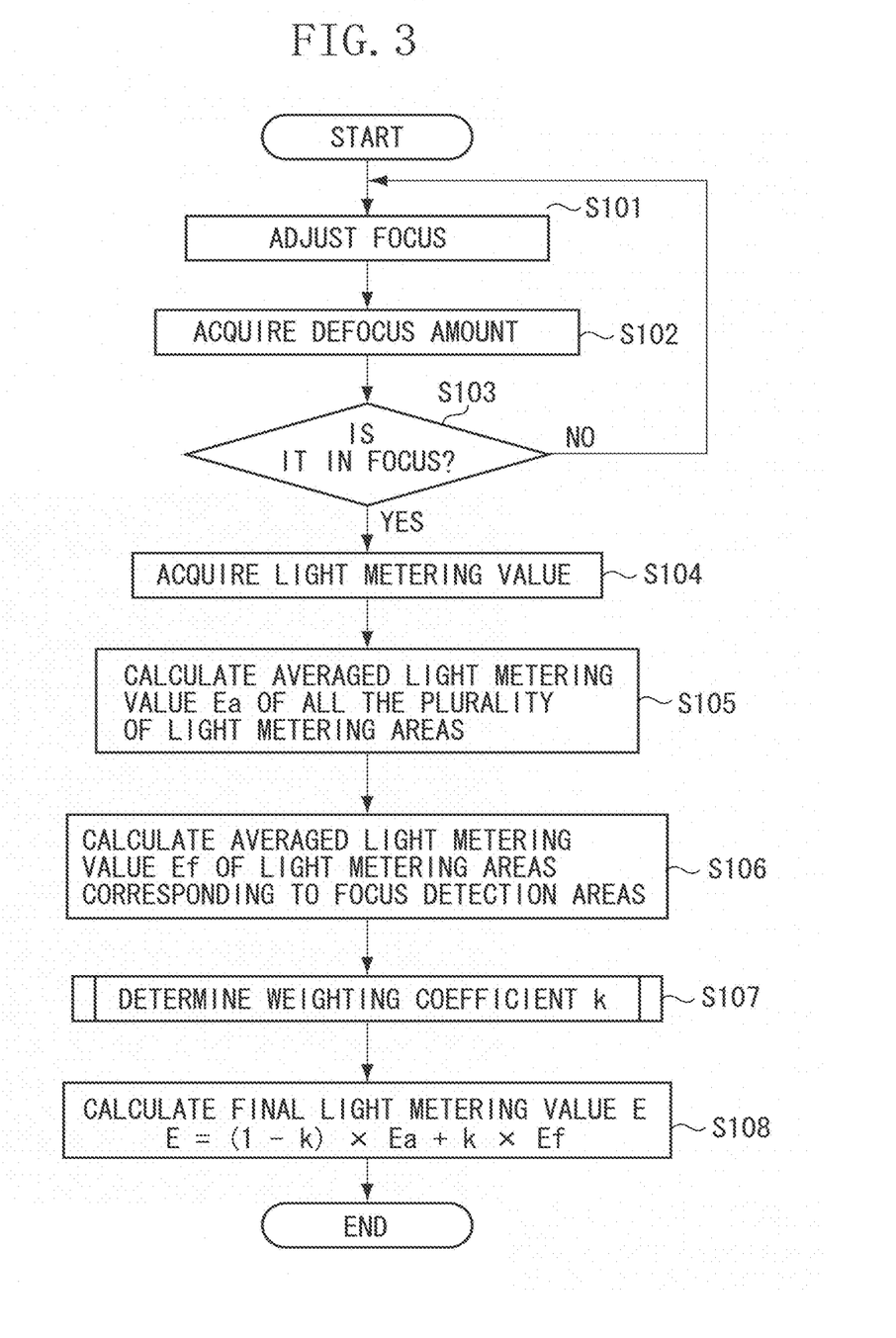
FIG. 3 is a flow chart illustrating processing of calculating a light metering value according to the first exemplary embodiment of the present invention.

Processing for calculating the light metering values according to the present exemplary embodiment is described below with reference to a flow chart of FIG. 3. The flow chart of FIG. 3 is started, for example, when the release button (not illustrated) is half-pressed to instruct a start of an image-capturing preparation operation.

In step S101, the defocus amount acquisition unit 4 acquires the defocus amounts and the focus adjusting unit 6 adjusts, with reference to the acquired defocus amount of each focus detection area, a focus by moving a photographing lens (not illustrated) corresponding to the focus detection area selected by using a predetermined algorism.

In step S102, the CPU 1 stores the defocus amounts, which are acquired by the defocus amount acquisition unit 4 based on the output from the AF sensor 3 after completing the focus adjustment, in the memory 5.

In step S103, the CPU 1 determines whether the focus detection areas are in an in-focus state based on the defocus amounts stored in the memory 5. The focus detection areas are selected according to the predetermined algorism. In a case where the CPU 1 determines that the focus detection areas are in the in-focus state (YES in step S103), the processing proceeds to step S104. In a case where the CPU 1 determines that the focus detection areas are not in the in-focus state (NO in step S103), the processing returns to step S101, and the focus adjustment operation and the acquisition of the defocus amounts are repeated until the selected focus detection areas become the in-focus state. The defocus amounts stored in the memory 5 are updated every time the defocus amounts are obtained.

In step S104, the AE sensor 2 performs the light metering to obtain and output the light metering value of each of the plurality of light metering areas.

In step S105, the exposure calculation unit 8 calculates the averaged light metering value Ea of the light metering values of all the plurality of light metering areas based on the light metering values of the plurality of light metering areas acquired from the AE sensor 2 (i.e., second calculation). In step S106, the exposure calculation unit 8 calculates the averaged light metering value Ef of the light metering values of the light metering areas corresponding to the focus detection areas (i.e., first calculation).

In step S107, the weighting determination unit 7 subsequently determines the weighting coefficient k when a final light metering value E to be used for the exposure control is calculated based on the defocus amount of each focus detection area stored in the memory 5. Processing performed in step S107 is described below in detail.

In step S108, the exposure calculation unit 8 calculates the final light metering value E based on the weighting coefficient k determined in step S107.

When the exposure calculation unit 8 calculates the exposure value based on the light metering value E as the result of the weighting calculation and the release button (not illustrated) is fully pressed, the exposure control unit 9 performs the exposure control for still image-capturing based on the calculated exposure value.

A method for determining the weighting coefficient k performed in step S107 is described below with reference to FIGS. 4A to 4D and 5.

Figure 4A:
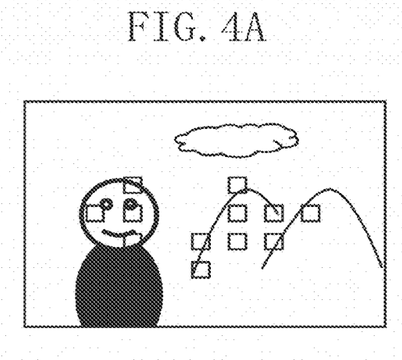
FIGS. 4A through 4D are examples of finder images and defocus amount distributions in different depths of field.
Figure 4B:
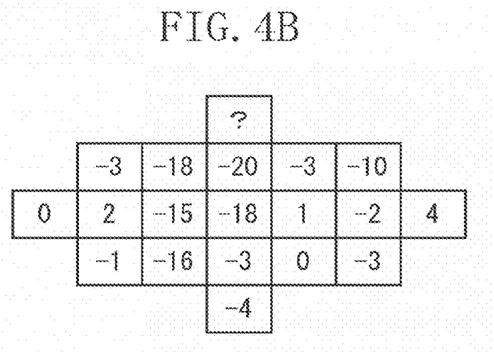
Figure 4C:
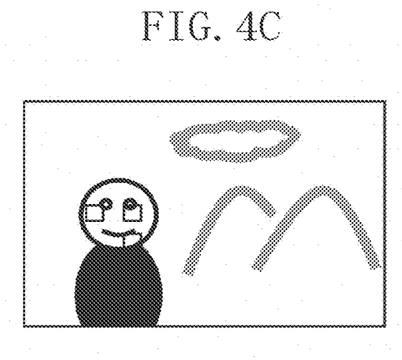

FIG. 4A to 4D illustrate examples of finder images and defocus amount distributions in different depths of field. FIGS. 4A and 4C illustrate a state in that the camera focuses on the same object but the depth of field of FIG. 4C is shallower than that of FIG. 4A.

Figure 4D:
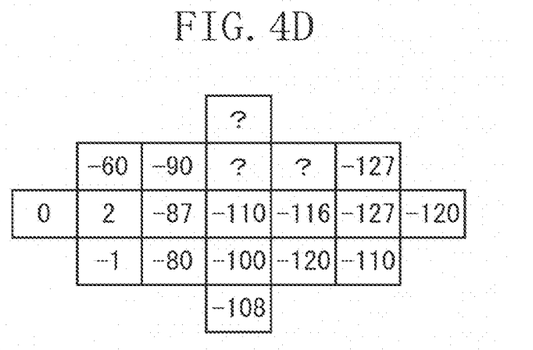

Squares in FIGS. 4A and 4C represent focus detection areas within a focusing range (i.e., within a range that the absolute values of the defocus amounts are equal to or less than a threshold value). FIGS. 4B and 4D illustrate the defocus amount distributions of the focus detection areas at the time.

In FIGS. 4B and 4D, the defocus amounts of the areas at which the object is positioned nearer than a shooting distance to be in focus are represented by positive values, whereas the areas of which defocus amounts cannot be calculated because of a low contrast, e.g., a blue sky, are represented by "?".

In a case where priority is given to a background and an image is captured in a state where the entire object field is in focus, many focus detection areas are included in the focusing range as illustrated in FIG. 4A, and the defocus amounts become nearly "0" in many focus detection areas as illustrated in FIG. 4B. The above described characteristic is more remarkably shown in a wide shot in which depth of field becomes deeper.

On the other hand, in a case where the background is defocused to capture more emphasized image of the main object, the depth of field becomes shallower. Therefore, the number of the focus detection areas within the focusing range becomes less as illustrated in FIG. 4C, and the absolute values of the defocus amounts of the focus detection areas at which the background exists become larger as illustrated in FIG. 4D.

In a case where the absolute values of the defocus amounts of many focus detection areas are close to "0" as illustrated in FIG. 4B, the weighting coefficient k in equation (1) is determined to be smaller. In other words, a ratio of the averaged light metering value Ef of the light metering areas corresponding to the focus detection areas in the final weighting calculation of the light metering value E is determined to be smaller. More specifically, in comparison with the case of FIG. 4D, the difference between the weighting coefficient with respect to a first light metering area corresponding to the focus detection area at which the first defocus amount is acquired and the weighting coefficient with respect to a second light metering area corresponding to the focus detection area at which a second defocus amount having the absolute value larger than the absolute value of the first defocus amount is acquired, is determined to be smaller.

As described above, the weighting coefficient of the first light metering area and the weighting coefficient of the second light metering area are determined to perform a suitable exposure control with respect to the entire object field.

On the other hand, as illustrated in FIG. 4D, in a case where there is an area having a large absolute value of the defocus amount, the weighting coefficient k in equation (1) is determined to be larger. In other words, a ratio of the averaged light metering value Ef of the light metering areas corresponding to the focus detection areas in the final weighting calculation of the light metering value E is determined to be larger. More specifically, in comparison with the case of FIG. 4B, a difference between the weighting coefficient with respect to the first light metering area corresponding to the focus detection area at which the first defocus amount is obtained and the weighting coefficient with respect to the second light metering area corresponding to the focus detection area at which the second defocus amount having the absolute value larger than the absolute value of the first defocus amount is obtained, is made larger.

As described above, the weighting coefficient of the first light metering area and the weighting coefficient of the second light metering area are determined to perform the suitable exposure control with respect to the main object within the focusing range.

Figure 5:
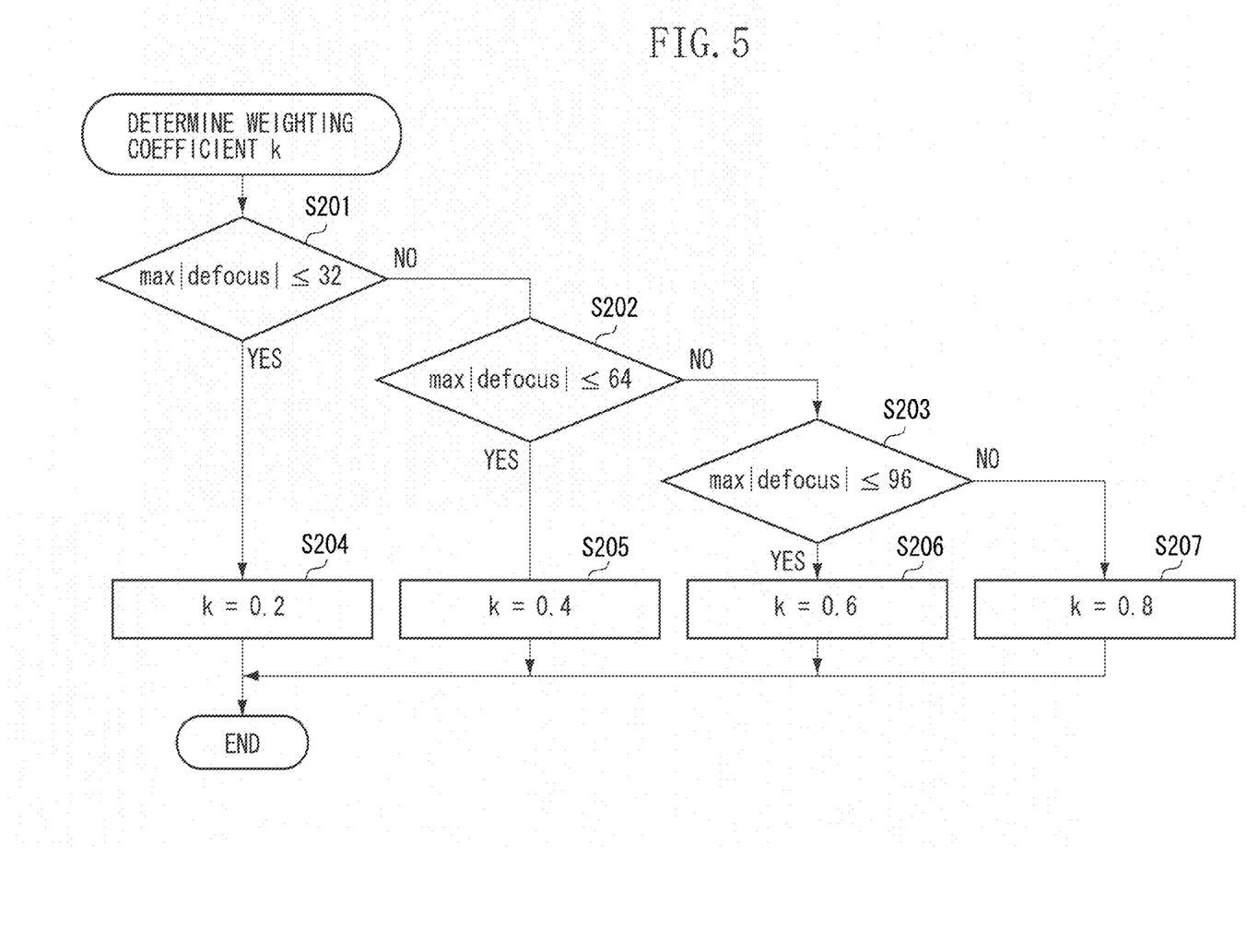
FIG. 5 is a flow chart illustrating a method for determining a weighting coefficient k according to the first exemplary embodiment of the present invention.

FIG. 5 is a flow chart illustrating processing for determining the weighting coefficient k. The processing is executed by the weighting determination unit 7.

In step S201, the weighting determination unit 7 determines whether the maximum value of the absolute value of the defocus amount of each focus detection areas is equal to or less than 32. In a case where the maximum value is equal to or less than 32 (YES in step S201), the processing proceeds to step S204. In step S204, the processing for determining the weighting coefficient k is ended after determining the weighting coefficient k to 0.2.

In a case where the maximum value is larger than 32 (NO in step S201), the processing proceeds to step S202 where the weighting determination unit 7 determines whether the maximum value of the absolute value of the defocus amount is equal to or less than 64. In a case where the maximum value is larger than 32 and equal to or less than 64 (YES in step S202), the processing proceeds to step S205. In step S205, the processing for determining the weighting coefficient k is ended after determining the weighting coefficient k to 0.4.

In a case where the maximum value is larger than 64 (NO in step S202), the processing proceeds to step S203 where the weighting determination unit 7 determines whether the maximum value of the absolute value of the defocus amount is equal to or less than 96. In a case where the maximum value is larger than 64 and equal to or less than 96 (YES in step S203), the processing proceeds to step S206. In step S206, the processing for determining the weighting coefficient k is ended after determining the weighting coefficient k to 0.6. In a case where the maximum value is larger than 96 (NO in step S203), the processing proceeds to step S207. In step S207, the processing for determining the weighting coefficient k is ended after determining the weighting coefficient k to 0.8.

As described above, as the maximum value of the absolute value of the defocus amount of each focus detection areas is smaller, the weighting of the averaged light metering value Ef of the light metering areas corresponding to the focus detection areas in the final weighting calculation of the light metering value E is determined to be smaller.

Therefore, in a case where the absolute values of the defocus amounts of many focus detection areas are close to 0, a suitable exposure control can be performed with respect to the entire object field considering the main object. In a case where there is an area having a large absolute value of the defocus amount, a suitable exposure control can be performed with respect to the main object.

In other words, in both of a case where a photographer captures an image with priority on the background and a case where the photographer captures an image with priority on the main object, perform the suitable exposure control by using the defocus amount of each of the plurality of focus detection areas.

In a case where the weighting coefficient k is determined based on the maximum values of the absolute values of the defocus amounts of the plurality of focus detection areas in the same manner as performed in the first exemplary embodiment, if there is a focus detection area having a particularly large defocus amount, the weighting coefficient k that is not suitable to a captured scene can be determined.

Therefore, in a second exemplary embodiment, a frequency distribution is produced as to the absolute value of the defocus amount of each focus detection area to determine the weighting coefficient k based on the frequency distribution. The second exemplary embodiment is different from the first exemplary embodiment only in the method for determining the weighting coefficient k in step S107, so that the method for determining the weighting coefficient k is described below in detail with reference to FIG. 6, and descriptions as to other configurations and processing are omitted here.

Figure 6:
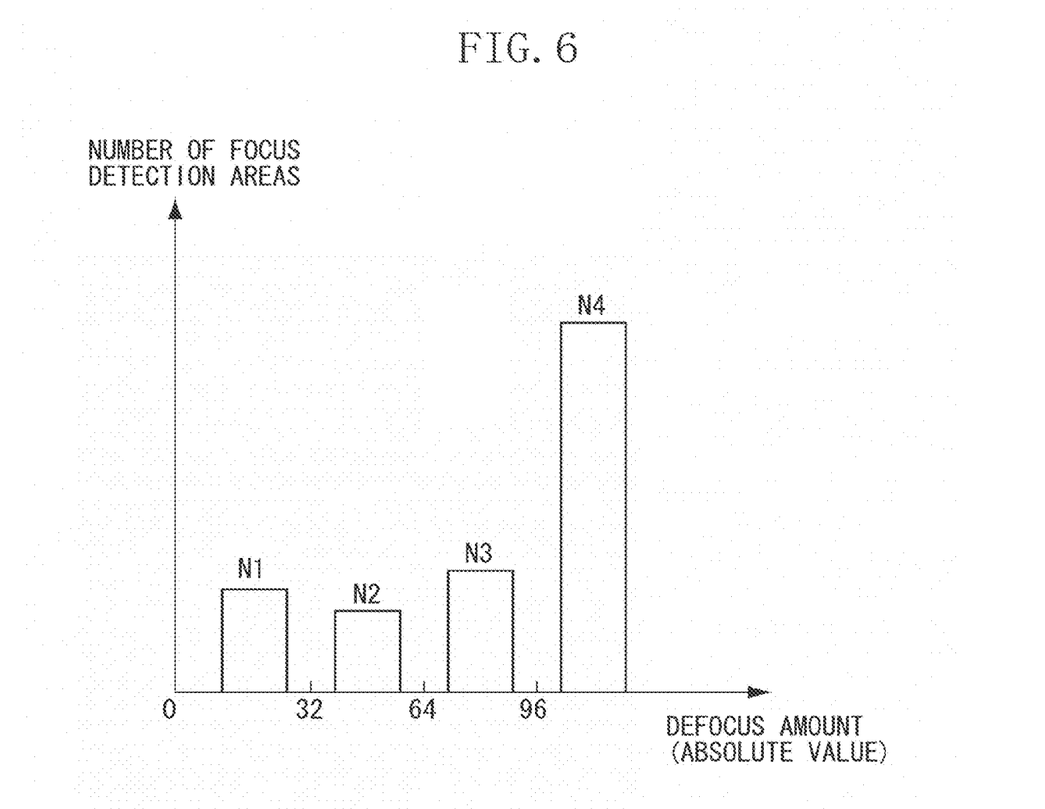
FIG. 6 is an example of a frequency distribution table of a defocus amount according to a second exemplary embodiment of the present invention.

FIG. 6 illustrates a frequency distribution chart obtained in such a manner that the absolute values of the defocus amounts of the focus detection areas are divided into a plurality of groups and the number of focus detection areas included in each group is counted.

More specifically, the number of the focus detection areas of which absolute values of the defocus amounts are equal to or less than 32 is represented by N1, the number of focus detection areas of which absolute values of the defocus amounts are larger than 32 and equal to or less than 64 is represented by N2, the number of the focus detection areas of which absolute values of the defocus amounts are larger than 64 and equal to or less than 96 is represented by N3, and the number of focus detection areas of which absolute values of the defocus amounts are larger than 96 is represented by N4, respectively. Here, the focus detection areas at which the defocus amounts could not be acquired are ignored.

In an example illustrated in FIG. 6, N4 shows the largest number, resulting in being considered that there are many focus detection areas having large absolute values of the defocus amounts, i.e., the background is fully-defocused. Therefore, the weighting coefficient k is determined to be larger (e.g., K=0.8) to perform the suitable exposure control with respect to the main object.

To the contrary, if N1 shows the largest number, it is considered that the absolute values of the defocus amounts of many focus detection areas are close to 0, i.e., many focus detection areas are within the focusing range. Therefore, the weighting coefficient k is determined to be smaller (e.g., K=0.2) to perform the suitable exposure control with respect to the entire object field.

If N2 or N3 shows the largest number, the weighting coefficient k may be determined to a value existing between the case where N1 shows the largest number and the case where N4 shows the largest number. For example, in a case where N2 shows the largest number, the weighting coefficient k may be determined to 0.4, whereas, in a case where N3 shows the largest number, the weighting coefficient k may be determined to 0.6.

In other words, the plurality of focus detection areas are divided into a plurality of groups according to a magnitude of the absolute value of the defocus amount of each of the plurality of focus detection areas, and the number of focus detection areas included in each group is compared to each other.

Accordingly, the weighting determination unit 7 determines the weighting coefficient based on the absolute values of the defocus amounts corresponding to those of the group including the largest number of focus detection areas. At that time, the weighting determination unit 7 determines the weighting coefficient k to be smaller as the corresponding absolute values of the defocus amounts are smaller.

In other words, the plurality of focus detection areas are divided into a plurality of groups based on a magnitude of the absolute value of the defocus amount of each of the plurality of focus detection areas, and as the absolute values of the defocus amounts corresponding to those of the group including the largest number of focus detection areas are smaller, a difference between the weighting coefficient with respect to a first light metering area corresponding to the focus detection area at which a first defocus amount is acquired and the weighting coefficient with respect to a second light metering area corresponding to a focus detection area at which a second defocus amount having an absolute value larger than the absolute value of the first defocus amount is acquired is determined to be smaller.

As described above, in the present exemplary embodiment, the frequency distribution regarding the defocus amount is acquired to determine the weighting coefficient k according to a relation in magnitude between N1, N2, N3, and N4. Accordingly, the weighting determination unit 7 can determine the weighting coefficient k more accurately and properly to the captured scene than the first exemplary embodiment.

In a third exemplary embodiment, the weighting determination unit 7 determines the weighting coefficient k based on the maximum values of the absolute values of the defocus amounts of the plurality of focus detection areas in the same manner as determined in the first exemplary embodiment. However, the third exemplary embodiment is different from the first exemplary embodiment in that the focal length of the photographing lens is also used in determining the weighting coefficient k.

The focal length is used because the depth of field changes according to the focal length. Therefore, even in a case where the maximum values of the absolute values of the defocus amounts are the same, the weighting coefficient k is determined to be different if the focal length is different.

The third exemplary embodiment is different from the first exemplary embodiment only in the method for determining the weighting coefficient k in step S107. Therefore, the method for determining the weighting coefficient k is described below in detail with reference to FIG. 7, and descriptions of other configurations and processing are omitted here.

Figure 7:
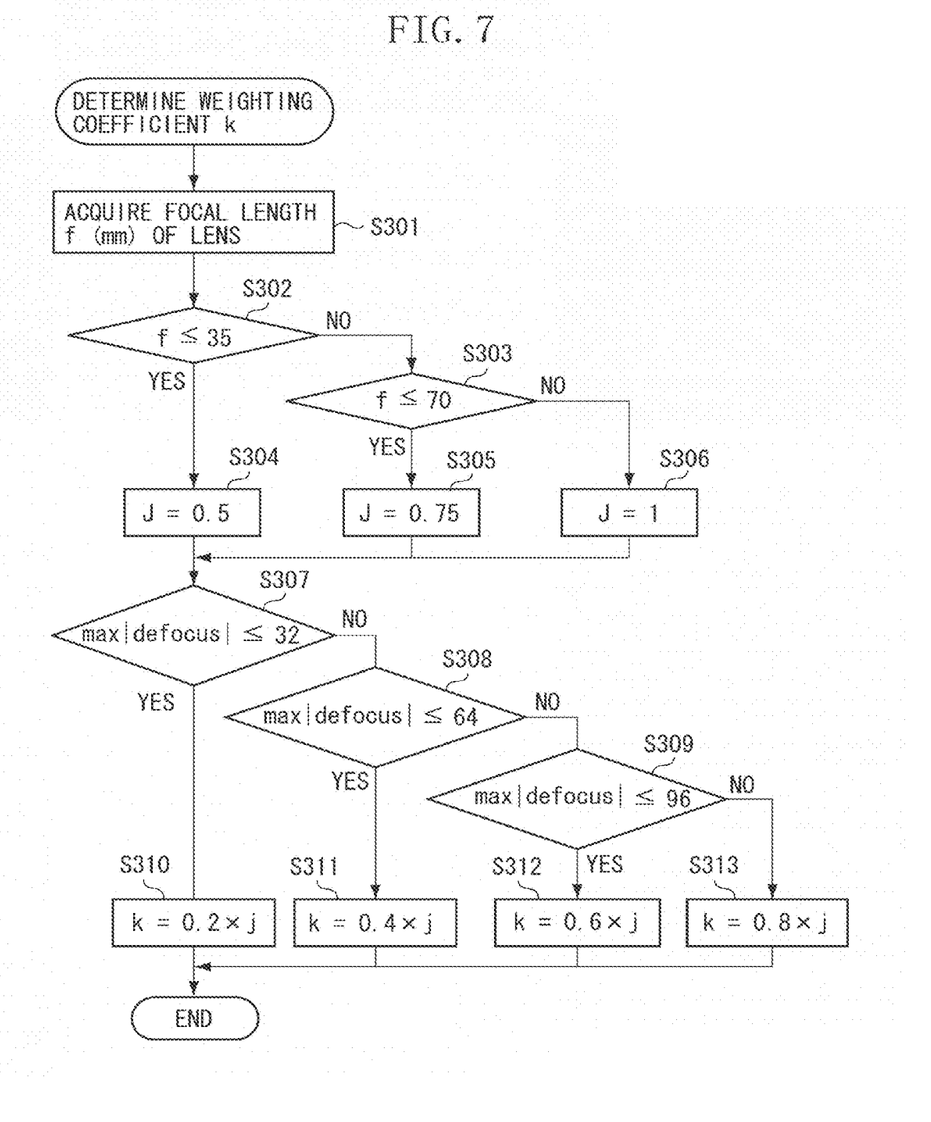
FIG. 7 is a flow chart illustrating a method for determining a weighting coefficient k according to a third exemplary embodiment of the present invention.

In step S301, the weighting determination unit 7 acquires information of the focal length f of the photographing lens from the memory 5.

In steps S302 through S306, the weighting determination unit 7 subsequently classifies the focal length f into a group based on the information acquired in step S301, and determines a correction coefficient j for correcting the maximum value of the weighting coefficient k for each group.

In step S302, the weighting determination unit 7 determines whether the focal length f of the photographing lens is equal to or less than 35 mm. In a case where the focal length f is equal to or less than 35 mm (YES in step S302), the processing proceeds to step S304. In step S304, the correction coefficient j is determined to be "0.5", and the processing proceeds to step S307.

In a case where the focal length f is larger than 35 mm (NO in step S302), the processing proceeds to step S303. In step S303, the weighting determination unit 7 determines whether the focal length f is equal to or less than 70 mm.

In a case where the focal length f is larger than 35 mm and equal to or less than 70 mm (YES in step S303), the processing proceeds to step S305. In step S305, the correction coefficient j is determined to be "0.75", and the processing proceeds to step S307.

In a case where the focal length f is larger than 70 mm (NO in step S303), the processing proceeds to step S306. In step S306, the correction coefficient j is determined to be "1", and the processing proceeds to step S307.

In steps S307 through S313, sorting is performed based on the maximum value of the absolute value of the defocus amount of each focus detection area, and the weighting coefficient k is determined for each group.

In step S307, the weighting determination unit 7 determines whether the maximum value of the absolute value of the defocus amount of each focus detection area is equal to or less than 32. In a case where the maximum value is equal to or less than 32 (YES in step S307), the processing proceeds to step S310. In step S310, the processing for determining the weighting coefficient k is ended after determining the weighting coefficient k to 0.2×j.

In a case where the maximum value is larger than 32 (NO in step S307), the processing proceeds to step S308. In step S308, the weighting determination unit 7 determines whether the maximum value of the absolute value of the defocus amount is equal to or less than 64. In a case where the maximum value is larger than 32 and equal to or less than 64 (YES in step S308), the processing proceeds to step S311. In step S311, the processing for determining the weighting coefficient k is ended after determining the weighting coefficient k to 0.4×j.

In a case where the maximum value is larger than 64 (NO in step S308), the processing proceeds to step S309. In step S309, the weighting determination unit 7 determines whether the maximum value of the absolute value of the defocus amount is equal to or less than 96. In a case where the maximum value is larger than 64 and equal to or less than 96 (YES in step S309), the processing proceeds to step S312. In step S312, the processing for determining the weighting coefficient k is ended after determining the weighting coefficient k to 0.6×j.

In a case where the maximum value is larger than 96 (NO in step S309), the processing proceeds to step S313. In step S313, the processing for determining the weighting coefficient k is ended after determining the weighting coefficient k to 0.8×j.

As described above, in the present exemplary embodiment, since the weighting determination unit 7 acquires the information of the focal length, and uses the correction coefficient j that changes according to the focal length f when determining the weighting coefficient k in steps S310 through S313, the maximum value of the weighting coefficient k changes according to the focal length f.

Therefore, for example, in a case where there is a focus detection area having a particularly large defocus amount in wide shot, the maximum value of the weighting coefficient k is corrected by the correction coefficient j. As a result thereof, the weighting of the averaged light metering value Ef of the light metering areas corresponding to the focus detection areas becomes smaller.

Therefore, the weighting coefficient k can be prevented from being a value that is not suitable for the captured scene due to an adverse effect of the focus detection area having a particularly large defocus amount. As a result thereof, determination of the weighting coefficient k suitable for the captured scene can be achieved more accurately than the first exemplary embodiment.

The configuration of the present exemplary embodiment in that the focal length of the photographing lens is used in determining the weighting coefficient k is applicable also to the second exemplary embodiment.

The exemplary embodiments of the present invention are described above. However, the present invention is not limited thereto but various modifications and changes can be made without departing from the spirit and scope of the present invention.

For example, the numeral values used in the above described exemplary embodiments are mere examples, and thus the numeral values may be replaced by other values.

In the first and the third exemplary embodiments, the weighting determination unit 7 determines the weighting coefficient k based on the maximum value of the absolute value of the defocus amount. However, the weighting determination unit 7 may determine the weighting coefficient k so that the predetermined number of absolute values of the defocus amounts is extracted in the order from larger absolute values, and the weighting coefficient k is determined to be smaller as the averaged value of the above extracted absolute values is smaller.

Accordingly, the weighting coefficient k is prevented from being a value not suitable for the captured scene because of the adverse effect of the focus detection area that has the particularly large defocus amount.

In the first and the third exemplary embodiments, the weighting determination unit 7 may determine the weighting coefficient k without using the absolute values of the defocus amounts equal to or more than the predetermined value. With the above described configuration, the weighting coefficient k can be prevented from being the value not suitable for the captured scene because of the adverse effect of the focus detection area having the particularly large defocus amount.

In the above described three exemplary embodiments, the light metering value Ea to be used in the final weighting calculation of the light metering value E is determined to the averaged light metering value of all the plurality of light metering areas. However, as long as the light metering value of the background is considered as the final light metering value E, the light metering value may be the weighted average value obtained in such a manner that the weighting of the predetermined areas are determined to be larger.

Alternatively, the light metering value of the background may be an averaged light metering value of not all the plurality of light metering areas but the plurality of light metering areas excluding a part of the light metering areas.

Further, in a case where there are many light metering areas corresponding to the focus detection areas, the light metering areas to be used in calculating the light metering value Ea may coincide with the light metering areas to be used in calculating the light metering value Ef. In other words, such a configuration can be employed that the final light metering value E is obtained by the weighting calculation in which the first light metering value obtained after being subjected to the weighting calculation based on the defocus amount and the second light metering value obtained without being subjected to the weighting calculation based on the defocus amount are weighted and averaged.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-056809 filed Mar. 15, 2011, which is hereby incorporated by reference herein in its entirety.

What is claimed is:

1. An imaging apparatus that has a plurality of focus detection areas and a plurality of light metering areas, comprising:
 a defocus amount acquisition unit configured to acquire a defocus amount of each focus detection area;
 a light metering unit configured to acquire a light metering value of each light metering area; and
 a determination unit configured to determine a weighting coefficient for each light metering area;
 wherein the determination unit determines the weighting coefficient for a second light metering area corresponding to a focus detection area at which a second defocus amount having an absolute value larger than an absolute value of a first defocus amount is acquired relatively smaller than the weighting coefficient for a first light metering area corresponding to a focus detection area at which a first defocus amount is acquired, and changes a difference between the weighting coefficient for the first light metering area and the weighting coefficient for the second light metering area based on a plurality of defocus amounts including the defocus amount of the focus detection area not corresponding to the first light metering area and the second light metering area, the plurality of defocus amounts being acquired by the defocus amount acquisition unit.

2. The imaging apparatus according to claim 1, wherein the determination unit classifies the plurality of focus detection areas into a plurality of groups based on a magnitude of the absolute value of the defocus amount of each of the plurality of focus detection areas, and determines the difference between the weighting coefficient for the first light metering area and the weighting coefficient for the second light metering area to be smaller as the absolute values of the defocus amounts corresponding to a group including the largest number of focus detection areas are smaller.

3. The imaging apparatus according to claim 1, wherein the determination unit determines the difference between the weighting coefficient for the first light metering area and the weighting coefficient for the second light metering area to be smaller as the maximum value of the absolute value of each of the plurality of defocus amounts is smaller.

4. The imaging apparatus according to claim 1, wherein the determination unit determines the difference between the weighting coefficient for the first light metering area and the weighting coefficient for the second light metering area to be smaller as an averaged value of the predetermined numbers of the absolute values of the plurality of defocus amounts, which are selected in the order from the larger values, is smaller.

5. The imaging apparatus according to claim 1, wherein the determination unit changes the difference between the weighting coefficient for the first light metering area and the weighting coefficient for the second light metering area without using the defocus amount having the absolute value equal to or more than a predetermined value among the defocus amounts acquired by the defocus amount acquisition unit.

6. The imaging apparatus according to claim 1, further comprising:
an information acquisition unit configured to acquire information of a focal length of the imaging apparatus;
wherein the determination unit determines the difference between the weighting coefficient for the first light metering area and the weighting coefficient for the second light metering area to be smaller as the focal length based on the information acquired by the information acquisition unit is shorter in a case where the absolute values of the plurality of defocus amounts are the same.

7. An imaging apparatus including a plurality of focus detection areas and a plurality of light metering areas, comprising:
a defocus amount acquisition unit configured to acquire a defocus amount in each focus detection area;
a light metering unit configured to acquire a light metering value of each light metering area;
a first calculation unit configured to calculate a first light metering value by performing weighting, based on the defocus amount acquired by the defocus amount acquisition unit, on the light metering value acquired by the light metering unit;
a second calculation unit configured to calculate a second light metering value without performing weighting, based on the defocus amount acquired by the defocus amount acquisition unit, on the light metering value acquired by the light metering unit;
an exposure calculation unit configured to calculate an exposure value based on a result of the first light metering value and the second light metering value being subjected to the weighting calculation; and
a determination unit configured to determine a weighting coefficient so that the weighting of the first light metering value becomes smaller in the weighting calculation performed by the exposure calculation unit based on the defocus amounts acquired by the defocus amount acquisition unit.

8. The imaging apparatus according to claim 7, wherein the determination unit classifies the plurality of focus detection areas into a plurality of groups according to a magnitude of the absolute value of the defocus amount of each of the plurality of focus detection areas, and determines the weighting coefficient so that the weighting of the first light metering value becomes smaller in the weighting calculation performed by the exposure calculation unit as the absolute values of the defocus amounts corresponding to a group including the largest number of focus detection areas are smaller.

9. The imaging apparatus according to claim 7, wherein the determination unit determines the weighting coefficient so that the weighting of the first light metering value becomes smaller in the weighting calculation performed by the exposure calculation unit as the maximum value of the absolute value of the defocus amount acquired by the defocus amount acquisition unit is smaller.

10. The imaging apparatus according to claim 7, wherein the determination unit determines the weighting coefficient so that the weighting of the first light metering value becomes smaller in the weighting calculation performed by the exposure calculation unit as an averaged value of a predetermined number of absolute values of the defocus amounts, which are selected in the order from the larger values, acquired by the defocus amount acquisition unit is smaller.

11. The imaging apparatus according to claim 7, wherein the determination unit determines the weighting coefficient without using the defocus amount having the absolute value equal to or more than a predetermined value among the defocus amounts acquired by the defocus amount acquisition unit.

12. The imaging apparatus according to claim 7, further comprising:
an information acquisition unit configured to acquire information of a focal length of the imaging apparatus;
wherein the determination unit determines the weighting coefficient so that the weighting of the first light metering value becomes smaller in the weighting calculation performed by the exposure calculation unit as the focal length based on the information acquired by the information acquisition unit is shorter in a case where the absolute values of the defocus amounts acquired by the defocus amount acquisition unit are the same.

13. The imaging apparatus according to claim 7, wherein the first calculation unit calculates the first light metering value by performing weighting based on the defocus amount acquired by the defocus amount acquisition unit on the light metering value of each area positioned at a position corresponding to any one of the plurality of focus detection areas among the plurality of light metering areas, the light metering value being acquired by the light metering unit.

14. The imaging apparatus according to claim 7, wherein the second calculation unit calculates the second light metering value by averaging the light metering values, which are acquired by the light metering unit, of the plurality of light metering areas including an area which is not positioned at a position corresponding to anyone of the plurality of focus detection areas.

15. A method for controlling an imaging apparatus, comprising:
acquiring a defocus amount of each of a plurality of focus detection areas;
acquiring a light metering value of each of a plurality of light metering areas; and
determining a weighting coefficient for each light metering area;
wherein the weighting coefficient for a second light metering area corresponding to the focus detection area at which a second defocus amount having an absolute value larger than an absolute value of a first defocus amount relatively is determined to be smaller than a weighting coefficient for a first light metering area corresponding to the focus detection area at which a first defocus amount is acquired, and a difference between the weighting coefficient for the first light metering area and the weighting coefficient for the second light metering area based on the plurality of acquired defocus amounts including the defocus amount of the focus detection area not corresponding to the first light metering area and the second light metering area.

16. A method for controlling an imaging apparatus, comprising:
   acquiring a defocus amount in each of a plurality of focus detection areas;
   acquiring a light metering value in each of a plurality of light metering areas;
   calculating a first light metering value by performing weighting based on the acquired defocus amount for the acquired light metering value;
   calculating a second light metering value without performing weighting based on the acquired defocus amount for the acquired light metering value;
   calculating an exposure value based on a result of the first light metering value and the second light metering value being subjected to a weighting calculation; and
   determining a weighting coefficient based on the acquired defocus amount so that the weighting of the first light metering value becomes smaller in the weighting calculation.

17. An imaging apparatus including a plurality of focus detection areas and a plurality of light metering areas, comprising:
   a focus detection information acquisition unit configured to acquire focus detection information in each focus detection area;
   a light metering unit configured to acquire a light metering value of each light metering area;
   a first calculation unit configured to calculate a first light metering value by performing weighting, based on the focus detection information acquired by the focus detection information acquisition unit, on the light metering value acquired by the light metering unit;
   a second calculation unit configured to calculate a second light metering value without performing weighting, based on the focus detection information acquired by the focus detection information acquisition unit, on the light metering value acquired by the light metering unit;
   an exposure calculation unit configured to calculate an exposure value based on a result of the first light metering value and the second light metering value; and
   a determination unit configured to determine, based on the focus detection information acquired by the focus detection information acquisition unit, a ratio between the first light metering value and the second light metering value used for the calculation of the exposure value by the exposure calculation unit.

18. The imaging apparatus according to claim 17, wherein the focus detection information is information indicating a defocus amount.

19. The imaging apparatus according to claim 17, wherein the determination unit changes the ratio in response to a change of the focus detection information acquired by the focus detection information acquisition unit.

20. An imaging apparatus including a plurality of focus detection areas and a plurality of light metering areas, comprising:
   a focus detection information acquisition unit configured to acquire focus detection information in each focus detection area;
   a light metering unit configured to acquire a light metering value of each light metering area;
   an exposure calculation unit configured to calculate an exposure value by performing weighting, based on the focus detection information acquired by the focus detection information acquisition unit, on the light metering value acquired by the light metering unit,
   wherein the exposure calculation unit changes a weighting coefficient for a light metering value of a main object based on the focus detection information acquired by the focus detection information acquisition unit.

21. The imaging apparatus according to claim 20, wherein the focus detection information is information indicating a defocus amount.

22. The imaging apparatus according to claim 20, wherein the main object is an object in focus.

23. The imaging apparatus according to claim 20, wherein the exposure calculation unit changes the weighting coefficient for the light metering value of the main object based on the focus detection information of focus detection areas which do not correspond to the main object.

24. A method for controlling an imaging apparatus including a plurality of focus detection areas and a plurality of light metering areas, comprising:
   acquiring focus detection information in each focus detection area;
   acquiring a light metering value of each light metering area;
   calculating a first light metering value by performing weighting, based on the focus detection information acquired, on the light metering value acquired;
   calculating a second light metering value without performing weighting, based on the focus detection information acquired, on the light metering value acquired;
   calculating an exposure value based on a result of the first light metering value and the second light metering value; and
   determining, based on the focus detection information acquired, a ratio between the first light metering value and the second light metering value used for the calculation of the exposure value.

* * * * *